Patented Aug. 10, 1943

2,326,440

UNITED STATES PATENT OFFICE 2,326,440

TREATMENT OF CONJUGATED DIENE HYDROCARBONS

David Craig, Akron, Ohio, assignor, by mesne assignments, to The B. F. Goodrich Company, Akron, Ohio, a corporation of New York No Drawing. Application April 19, 1941, Serial No. 389,469

9 Claims. (Cl. 260—681.5)

This invention relates to the treatment of conjugated diene hydrocarbons, and particularly to a method for obtaining piperylene from mixtures of conjugated diene hydrocarbons.

It has previously been known that certain conjugated diene hydrocarbons such as butadiene and isoprene react with sulfur dioxide to form sulfones, and that the dienes are liberated when the sulfones are heated. Although the formation of the conjugated diene sulfones has been employed as a step in the separation of conjugated dienes from other hydrocarbons, separation of the conjugated dienes from each other has not been obtained by this process since the known conjugated diene sulfones decompose in approximately the same temperature range.

I have now discovered that piperylene may be reacted with sulfur dioxide to form a monomeric sulfone. I have further discovered that piperylene may be recovered from a mixture of conjugated diene hydrocarbons by forming the monomeric diene sulfones and heating the mixture of sulfones at a temperature at which the piperylene sulfone decomposes but at which the other diene sulfones are relatively stable.

The method of this invention may be better understood from the following specific example in which piperylene was separated from a mixture containing $C_5$ monoolefines and isoprene. Into a 2.5 L. autoclave were placed 1020 gms. of the mixture, 960 gms. of sulfur dioxide, and 27.5 gms. of phenyl-beta-naphthylamine at atmospheric pressure and a temperature of about $-78°$ C. The autoclave was sealed and placed in a water bath at $50°$ C. After 15 minutes the bath was heated to $90°$ C. over a period of $2\frac{1}{2}$ hours, the pressure inside the autoclave rising to 130 lbs./in.$^2$. The autoclave was allowed to stand at room temperature over night. The unreacted sulfur dioxide and hydrocarbons containing some unreacted dienes were then distilled from the autoclave and the remaining contents discharged into a flask and slowly heated at atmospheric pressure in an oil bath. The material liberated from the mixed sulfones at the approximate range $80°-110°$ C. was essentially a mixture of sulfur dioxide and piperylene. The isoprene sulfone was quite stable at temperatures below $110°$ C., but decomposed rapidly at temperatures of $120°$ C. and above. Isoprene and piperylene may be separated from sulfur dioxide by distillation in the presence of a polymerization inhibitor such as a diarylamine or by treatment with alkali, and the sulfur dioxide may be used again in subsequent runs.

Although the specific example describes the separation of piperylene from isoprene, piperylene may be separated from other conjugated diene hydrocarbons such as butadiene or from mixtures of conjugated diene hydrocarbons by the same process, since piperylene sulfone completely decomposes at temperatures at which the other sulfones are relatively stable.

It is desirable to have a polymerization inhibitor present during the reaction of the dienes with the sulfur dioxide to minimize the formation of polymeric sulfones. Diaryl amines such as phenyl-beta-naphthylamine are preferred materials, although members of other well-known classes of polymerization inhibitors such as hydroquinone, resorcinol, pyrogallol, etc., may be employed if desired.

Although conjugated diene hydrocarbons react with sulfur dioxide at ordinary temperatures and pressures, it is preferred to form the sulfones at elevated temperatures and pressures to increase the rate of reaction. Temperatures up to $80°-90°$ C. in an autoclave sealed at a temperature below the boiling point of sulfur dioxide will in general be found to produce satisfactory yields in reasonable lengths of time.

The previously known monomeric conjugated diene sulfones are crystalline solids of well-defined melting point. Piperylene sulfone as ordinarily obtained is a reddish-brown oil which has not been distilled without decomposition. The methods of preparation are those previously employed with other conjugated diene hydrocarbons such as those described by Staudinger et al., Ber. 68B, 455–71 (1935).

Although I have herein described a specific embodiment of the invention, the invention is not to be regarded as limited solely thereto, for many modifications and variations which will be obvious to those skilled in the art are within the spirit and scope of the invention as defined in the appended claims.

I claim:

1. The method of separating piperylene from a mixture of conjugated diene hydrocarbons which comprises reacting said mixture with sulfur dioxide to form mixed monomeric diene sulfones, heating said mixed diene sulfones at a temperature at which piperylene sulfone is unstable but the other diene sulfones are relatively stable, and isolating the piperylene which is evolved.

2. The method which comprises forming a mixture of monomeric diene sulfones from a piperylene-containing mixture of conjugated diene hydrocarbons, and then heating said mixture at a temperature at which piperylene is essentially the sole conjugated diene evolved.

3. The method of separating piperylene from a mixture of piperylene and at least one other conjugated diene hydrocarbon which comprises reacting the mixed dienes at an elevated temperature and pressure with sulfur dioxide to form a mixture of monomeric diene sulfones, and then heating said mixture of diene sulfones at a temperature between about 80° and 110° C. to liberate the piperylene.

4. The method which comprises reacting a mixture of piperylene-containing conjugated diene hydrocarbons with sulfur dioxide in the presence of a polymerization inhibitor to form a mixture of monomeric diene sulfones, and then heating said mixture of diene sulfones at a temperature at which piperylene is essentially the sole conjugated diene evolved.

5. The method of claim 4 in which the polymerization inhibitor is phenyl-beta-naphthylamine.

6. The method of separating piperylene from a mixture of conjugated diene hydrocarbons which comprises reacting said mixture with sulfur dioxide to form mixed monomeric diene sulfones, heating said mixed diene sulfones at a temperature at which piperylene sulfone is unstable but the other diene sulfones are relatively stable, collecting the mixture of piperylene and sulfur dioxide which is evolved, and separating the piperylene from the sulfur dioxide.

7. The method of separating conjugated diene hydrocarbons which form sulfones of varying stability which comprises reacting a mixture of said conjugated diene hydrocarbons with sulfur dioxide to form mixed monomeric diene sulfones, heating said mixed diene sulfones at a temperature at which the least stable conjugated diene sulfone decomposes, collecting the mixture of conjugated diene hydrocarbon and sulfur dioxide which is evolved, and separating the conjugated diene hydrocarbon from the sulfur dioxide.

8. The method of separating piperylene and isoprene which comprises reacting a mixture of piperylene and isoprene with sulfur dioxide to form mixed monomeric diene sulfones, heating said mixed sulfones at a temperature below 110° C. to decompose the piperylene sulfone with the liberation of a mixture of piperylene and sulfur dioxide, and then heating the isoprene sulfone at a temperature sufficient to liberate a mixture of isoprene and sulfur dioxide.

9. The method of separating piperylene from a mixture of hydrocarbons which comprises reacting the mixture with sulfur dioxide in the presence of a polymerization inhibitor, separating the reaction product from the unreacted materials, and heating the reaction product at a temperature between about 80° and 110° C. to liberate the piperylene.

DAVID CRAIG.